(12) United States Patent
Mueller

(10) Patent No.: US 8,483,152 B1
(45) Date of Patent: Jul. 9, 2013

(54) METHOD AND APPARATUS FOR USE OF OFDMA IN A COMMUNICATION NETWORK

(75) Inventor: Arndt J. Mueller, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 694 days.

(21) Appl. No.: 12/689,858

(22) Filed: Jan. 19, 2010

Related U.S. Application Data

(60) Provisional application No. 61/145,377, filed on Jan. 16, 2009.

(51) Int. Cl.
H04W 4/00 (2009.01)
H04L 12/28 (2006.01)
H04L 12/56 (2006.01)

(52) U.S. Cl.
USPC .... 370/329; 370/330; 370/395.4; 370/395.41

(58) Field of Classification Search
USPC .......... 370/329, 344, 330, 342, 395.4, 395.41
See application file for complete search history.

(56) References Cited

U.S. PATENT DOCUMENTS

| | | | | |
|---|---|---|---|---|
| 7,742,495 B2* | 6/2010 | Kliger et al. | | 370/442 |
| 8,229,449 B2* | 7/2012 | Liu et al. | | 455/452.2 |
| 2002/0080816 A1* | 6/2002 | Spinar et al. | | 370/449 |
| 2003/0137993 A1* | 7/2003 | Odman | | 370/468 |
| 2008/0212591 A1* | 9/2008 | Wu et al. | | 370/395.21 |
| 2008/0214200 A1* | 9/2008 | Grandblaise et al. | | 455/452.2 |
| 2008/0279219 A1* | 11/2008 | Wu et al. | | 370/474 |
| 2008/0298241 A1* | 12/2008 | Ohana et al. | | 370/235 |
| 2009/0268675 A1* | 10/2009 | Choi | | 370/329 |
| 2010/0002644 A1* | 1/2010 | Choi et al. | | 370/329 |
| 2010/0082791 A1* | 4/2010 | Liu et al. | | 709/223 |
| 2010/0142540 A1* | 6/2010 | Matheney et al. | | 370/400 |
| 2010/0214916 A1* | 8/2010 | Wu et al. | | 370/230 |
| 2010/0238932 A1* | 9/2010 | Kliger et al. | | 370/392 |
| 2010/0309869 A1* | 12/2010 | Kim et al. | | 370/329 |
| 2011/0019687 A1* | 1/2011 | Franco et al. | | 370/431 |
| 2012/0147846 A1* | 6/2012 | Ho et al. | | 370/330 |

* cited by examiner

*Primary Examiner* — Farah Faroul
(74) *Attorney, Agent, or Firm* — Bruce Greenhaus; Richard Bachand

(57) ABSTRACT

A method is disclosed in which a first data transmission is received at a first network node from a second network node in a coordinated network. The first data transmission is received in a first bandwidth of a coordinated network and includes a first plurality of subcarriers. A second data transmission is received at the first network node from a third network node. The second data transmission is received in a second bandwidth of the coordinated network and includes a second plurality of subcarriers. A first transmission schedule is transmitted from the first network node to the second and third network nodes. The first transmission schedule includes modified first and second bandwidths in which the modified first bandwidth includes a subcarrier reallocated from the second bandwidth. The first network node receives data in accordance with the first transmission schedule.

28 Claims, 7 Drawing Sheets

METHOD AND APPARATUS FOR USE OF OFDMA IN A COMMUNICATION NETWORK

CROSS-REFERENCE TO RELATED APPLICATIONS

This application claims priority of U.S. Provisional Patent Application Ser. No. 61/145,377, which was filed on Jan. 16, 2009, the entirety of which is incorporated by reference herein.

FIELD OF DISCLOSURE

The disclosed system and method relate to data transmission. More specifically, the disclosed system and method relate to data transmission in orthogonal frequency division multiplexed (OFDM) networks.

BACKGROUND

In packet-based communication systems, such as communication systems in accordance with the Multimedia over Coaxial Alliance (MoCA) specification, the performance of short data packets is worse than the performance of long data packets. Short data packets do not perform as well as large data packets due to the large proportion of preamble overhead to the actual packet payload.

Accordingly, an improved system and method for data transmission in OFDM networks is desirable.

SUMMARY

A method is disclosed in which a first data transmission is received at a first network node from a second network node in a coordinated network. The first data transmission is received in a first bandwidth of a coordinated network and includes a first plurality of subcarriers. A second data transmission is received at the first network node from a third network node. The second data transmission is received in a second bandwidth of the coordinated network and includes a second plurality of subcarriers. A first transmission schedule is transmitted from the first network node to the second and third network nodes. The first transmission schedule includes modified first and second bandwidths in which the modified first bandwidth includes a subcarrier reallocated from the second bandwidth. The first network node receives data in accordance with the first transmission schedule.

A network node including a receiver and a transmitter is also disclosed. The receiver is configured to receive a first data transmission from a first network node in a first bandwidth of a coordinated network, which includes a first plurality of subcarriers, and receive a second data transmission from a second network node in a second bandwidth of the coordinated network, which includes a second plurality of subcarriers. The transmitter is configured to transmit a first transmission schedule to the first and second network nodes, the first transmission schedule including modified first and second bandwidths in which the modified first bandwidth includes a subcarrier reallocated from the second bandwidth.

Also disclosed is a computer readable storage medium encoded with program code, wherein when the program code is executed by a processor, the processor performs a method. The method includes receiving a first data transmission at a first network node from a second network node. The first data transmission is received in a first bandwidth of a coordinated network and includes a first plurality of subcarriers. A second data transmission is received at the first network node from a third network node. The second data transmission is received in a second bandwidth of the coordinated network and includes a second plurality of subcarriers. A first transmission schedule is transmitted from the first network node to the second and third network nodes. The first transmission schedule includes modified first and second bandwidths in which the modified first bandwidth includes a subcarrier reallocated from the second bandwidth. Data are received at the first network node in accordance with the first transmission schedule.

DETAILED DESCRIPTION

The disclosed system and method increase the throughput of packet-based data communication networks. The throughput is increased through the implementation of orthogonal frequency division multiple access (OFDMA) in which multiple transmitters may simultaneously transmit data to a single receiver using distinct subsets of OFDM subcarriers. When appropriately synchronized, the subcarriers transmitted from each of the network nodes are orthogonal with the subcarriers of the other network nodes. Implementing OFDMA in packet-based networks advantageously enables a single preamble to be shared by each of the transmitters thereby reducing the preamble overhead in the network. Additionally, an apparatus and method for dynamically reallocating bandwidth in a coordinated OFDMA network are also disclosed. Although the system and method disclosed herein are described as being implemented in a MoCA network, one skilled in the art will understand that the system and method are not so limited, and that the system and method may be implemented in any packet-based and/or coordinated network.

Figure 1:
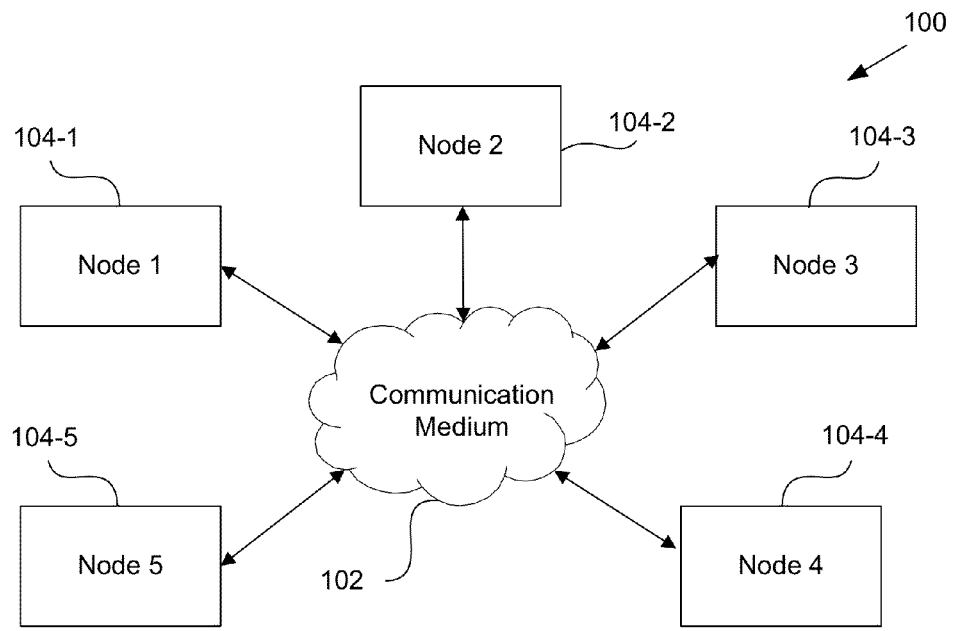
FIG. 1 is a block diagram of one example of a coordinated network.

FIG. 1 is a block diagram of one example of a coordinated network 100. As shown in FIG. 1, a plurality of network nodes 104-1:104-5 (collectively referred to as "network nodes 104") may be communicatively coupled to each other through communication medium 102. Although five network nodes are shown in FIG. 1, one skilled in the art will understand that fewer or more nodes may be coupled to each other through communication medium 102 to form a coordinated network. The network nodes 104 may be devices of a home entertainment system such as, for example, set top boxes (STBs), television (TVs), computers, DVD or Blu-ray players, gaming consoles, to name a few, each coupled to each other via the communication medium 102. Examples of the communication medium 102 include, but are not limited to, coaxial cable, fiber optic cable, a wireless transmission medium, and an Ethernet connection, to name a few.

Figure 2:
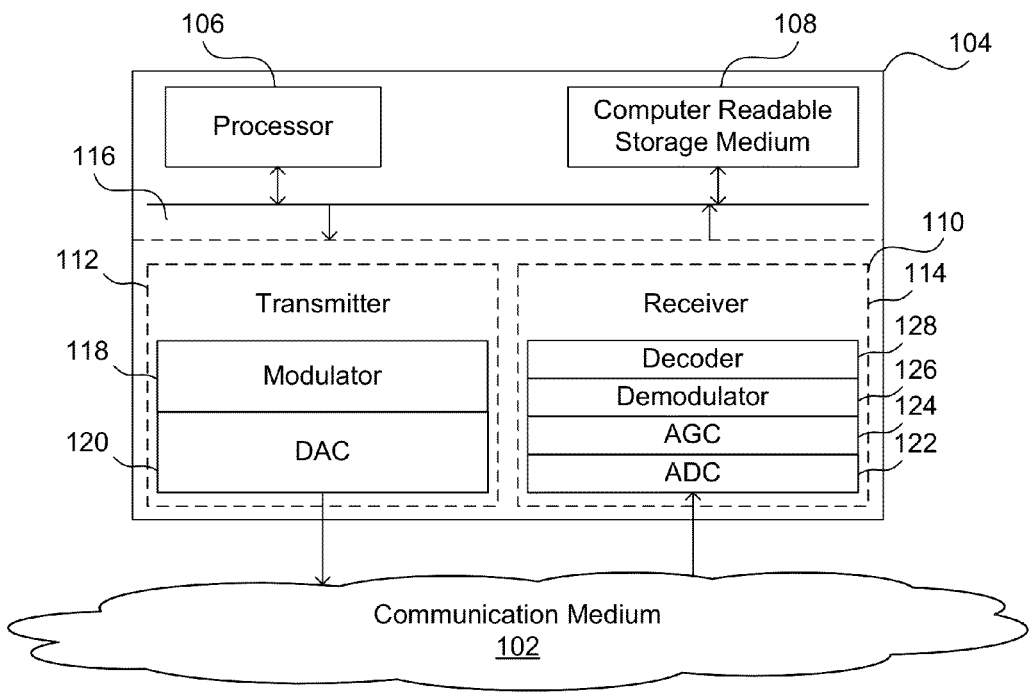
FIG. 2 is a block diagram of one example of a network node in accordance with the coordinated network illustrated in FIG. 1.

FIG. 2 illustrates a simplified block diagram of one example of a network node 104. As shown in FIG. 2, network node 104 may include a physical interface 110 including a transmitter 112 and a receiver 114, which are in data communication with a processor 106 through a data bus 116 as illustrated in FIG. 2. The transmitter 112 may include a modulator 118 for modulating data onto a plurality of OFDM subcarriers according to a quadrature amplitude modulation (QAM) scheme such as, for example, 8-QAM, 16-QAM, 32-QAM, 64-QAM, 128-QAM, or 256-QAM, to name a few, and a digital-to-analog converter (DAC) 120 for transmitting modulated signals to other network nodes 104 through the communication medium 102.

Receiver 114 may include an analog-to-digital converter (ADC) 122 for converting a modulated analog signal received from another network node 104 into a digital signal. Receiver 114 may also include an automatic gain control (AGC) circuit 124 for adjusting the gain of the receiver 114 to properly receive the incoming signal, a demodulator 126 for demodulating the received signal, and a decoder 128 for decoding parity check codewords such as, for example, low-density parity check (LDPC) codewords, BCH codewords, or codewords for another coding scheme. One skilled in the art will understand that the network nodes 104 may include additional circuitry and functional elements not described herein.

Processor 106 may be any central processing unit (CPU), microprocessor, micro-controller, or computational device or circuit for executing instructions. As shown in FIG. 2, the processor 106 is in signal communication with a computer readable storage medium 108 through data bus 116. The computer readable storage medium may include a random access memory (RAM) and/or a more persistent memory such as a read only memory (ROM). Examples of RAM include, but are not limited to, static random-access memory (SRAM), or dynamic random-access memory (DRAM). A ROM may be implemented as a programmable read-only memory (PROM), an erasable programmable read-only memory (EPROM), an electrically erasable programmable read-only memory (EEPROM), or like device configured to store data and instructions that may be executed by the processor 106 as will be understood by one skilled in the art.

In conventional MoCA networks, data packets are transmitted over a coaxial communication channel using orthogonal frequency division multiplexing (OFDM), and the communication through the network is managed by a Network Coordinator (NC) node. The NC may be any network node and may switch from node to node as nodes are added and removed from the network. The NC periodically broadcasts Beacons and Media Access Plan packets to the nodes connected to the network. The Beacons are transmitted at regular intervals (e.g., every 10 ms) and identify the channel time clock (CTC), the MoCA network version, the time of the next admission control frame (ACF), and when a NC handoff will occur (e.g., when the NC changes from one network node to another network node). MAP packets are transmitted more frequently by the NC than are Beacons and provide scheduling information that identify when each network node will be transmitting data through the network. The NC may receive reservation requests from each of the plurality of nodes between MAP packet transmissions in which the network nodes report their transmission capabilities and request to transmit data to other network nodes.

OFDMA Channelization

OFDMA frames or packets are aggregated packets in which OFDMA is used to aggregate multiple Physical Layer Service Data Units (PSDUs) in order to simultaneously transmit the aggregated PSDUs from different transmitting (TX) network nodes to a single receiving (RX) network node. While primarily used to aggregate short PSDUs, one skilled in the art will understand that OFDMA frames may also be used to transport large PSDUs.

The transport channel from a single OFDMA TX network node, e.g., network nodes 104, to the OFDMA RX network node is referred to as a media access control (MAC) sub-channel. Each OFDMA frame may transport a plurality of MAC sub-channels, with one MAC sub-channel being transmitted per TX network node. Each MAC sub-channel is assigned (m/N)-th the total network bandwidth, where m is an integer value that is less than or equal to N, and N is between the number of MAC sub-channels in an OFDMA frame, $N_{MACSubCh}$, and the maximum number of MAC sub-channels in the network, which in some embodiments is eight.

MAC sub-channels include a plurality of physical layer (PHY) sub-channels, which are fixed subsets of subcarriers from the total available set of OFDM subcarriers. In some implementations, each MAC sub-channel includes four PHY sub-channels and each OFDMA frame includes eight to 32 PHY sub-channels, with each PHY sub-channel transporting the same number of bits per OFDM symbol. Each PHY sub-channel may have a different number of subcarriers and varied bitloading on those subcarriers provided that all PHY sub-channels transport the same number of bits per OFDMA symbol. The bitloading within a PHY sub-channel may be constrained to a single value to save storage memory.

PHY Sub-Channels

Each subcarrier available for normal OFDM frames may be used for OFDMA frames. For example, if a communication system transmits data using 480 subcarriers, then each of the 480 subcarriers may be used for transmitting OFDMA frames. One skilled in the art will understand that fewer than the 480 available subcarriers may also be used for transmitting OFDMA frames. Subcarrier allocations within a PHY sub-channel may be pseudo-randomly distributed over the entire bandwidth to provide protection against narrowband interference. The number of PHY sub-channels may be determined in accordance with the following equation:

$$N_{PhySCh} = M \times N_{CW} \qquad \text{Eq. 1}$$

Where, $N_{CW}$ the number of low-density parity check (LDPC) codewords to be decoded by an LDPC decoder; and M is a variable integer greater than one.

An OFDMA LDPC decoder 128, such as the one illustrated in FIG. 2, may be configured to decode up to 8 simultaneous OFDMA LDPC codewords. Simultaneously decoding less than 8 simultaneous OFDMA LDPC codewords in decoder 128 provides an additional degree of flexibility in allocating bandwidth, but does not utilize the full processing capabilities of the decoder. For example, if there are 5 MAC sub-channels each having equal bandwidth requirements and $N_{CW}$=5, then each TX network node can be assigned ⅕-th of the total bandwidth. If $N_{CW}$ is constrained to equal 8, then each TX network node is apportioned ⅛-th of the total bandwidth, and ⅜-ths of the bandwidth may be wasted. In this case, the overall rate is ⅝-ths of the $N_{CW}$=5 case, and thus the LDPC codewords will fill more slowly. Accordingly, 8/5-ths more LDPC iterations can be performed.

MAC Sub-Channels

MAC sub-channels are single, unidirectional transport streams between a transmitting (TX) network node and a receiving (RX) network node. Accordingly, each TX/RX pair may have one MAC sub-channel per OFDMA frame. However, a TX/RX pair can have multiple MAC sub-channels provided each MAC sub-channel is transmitted in a different OFDMA frame. Each OFDMA frame transports a plurality of MAC sub-channels. In some implementations, each OFDMA frame transports between 2 and 8 MAC sub-channels.

The average number of subcarriers per PHY sub-channel may be determined by dividing the total number of PHY sub-channels by the product of M and $N_{CW}$. Accordingly, if there are 480 PHY sub-channels and assuming M=4, then the average number of subcarriers per PHY sub-channel is 60, 40, 30, 24, 20, 17.1429, and 15 for $N_{CW}$ equal to 2, 3, 4, 5, 6, 7 and 8 respectively. Note that the only awkward condition for M=4 occurs when $N_{CW}$ is equal to 7. Accordingly, if the number of subcarriers per PHY sub-channel is restricted to exactly 17, then only 476 subcarriers of the 480 available subcarriers will be utilized.

The multiplier M in Equation 1 effectively defines the number of PHY sub-channels per LDPC codeword. Setting M to be greater than one provides significant flexibility for OFDMA bandwidth reallocation because the number of subcarriers per PHY sub-channel is smaller, which consequently makes finding multiple different MAC sub-channels that can use that same PHY sub-channel easier.

As described above, the number of PHY sub-channels, $N_{PhySCh}$, may be determined in accordance with Equation 1. Consequently, the number of PHY sub-channels for the i-th MAC sub-channel may be described as:

$$N_{PhySCh,i} = M \times N_{CW,i} \quad \text{Eq. 2}$$

Where, $\Sigma(N_{CW,i}) = N_{CW} \leq 8$ (in this example)

Varying $N_{CW,i}$ advantageously enables the bandwidth allocation for each MAC sub-channel to be adapted to meet the current traffic patterns. The number of bits per MAC sub-channel per OFDMA symbol, $N_{BAS,i}$, may be described as:

$$N_{BAS,i} = N_{PhySch,i} \times N_{BPSCh} \quad \text{Eq. 3}$$

Satisfying Equation 3 helps ensure that the arrival rates of the LDPC codewords are equal even if the LDPC codeword boundaries do not fall on OFDM symbol boundaries. Failure to satisfying Equation 3 may require more memory and logic to performing the requisite buffering. When reallocating bandwidth between MAC sub-channels, blocks of M PHY sub-channels are reallocated to ensure that Equation 3 is satisfied.

In some implementations, the bit-loading is uniform for each of the PHY sub-channels and each of the PHY sub-channels have an equal number of bits per OFDMA symbol, $N_{BPSCh}$. Equal bit-loading and equal number of bits per OFDMA symbol helps to synchronize the LDPC codewords, simplify the buffering parallel codeword processing, and simplify the reallocation of OFDMA bandwidth between nodes. For example, if $N_{BPSCh}$ for each PHY sub-channel is set to 48 bits, then for any PHY sub-channel, the following combinations are valid: binary phase-shift keying (BPSK) on 48 sub-carriers, quadrature phase-shift keying (QPSK) on 24 sub-carriers, 8 phase-shift keying (PSK) on 16 sub-carriers, 16 quadrature amplitude modulation (QAM) on 12 sub-carriers, 64-QAM on 8 sub-carriers, or 256-QAM on 6 sub-carriers. Continuing this example, if uniform bitloading is not enforced (at the cost of storage memory), then any combination of constellations is allowed provided that the total number of $N_{BPSCh}$ equals 48. For each PHY sub-channel (or even each subcarrier), a power-control gain may be defined. The total number of bits per OFDMA (aka ACMT) symbol is thus $N_{BAS} = N_{SCh} \times N_{BPSCh}$.

OFDMA Frames

An OFDMA frame may be configured to transport a plurality of OFDMA MAC sub-channels. For example, an OFDMA frame may be configured to transport between 2 to 8 OFDMA MAC sub-channels, although one skilled in the art will understand that an OFDMA may be configured to transport more than 8 OFDMA MAC sub-channels. Each OFDMA MAC sub-channel transports data from one OFDMA transmitter to one OFDMA receiver over some set of OFDMA PHY sub-channels. Accordingly, each OFDMA PHY sub-channel consists of some subset of the 480 subcarriers available for normal OFDM frames.

OFDMA frames are defined by an OFDMA modulation profile and an OFDMA frame profile. The OFDMA modulation profile is exchanged after every OFDMA error vector magnitude (EVM) maintenance session and specifies the PHY sub-channel assignment for each subcarrier (e.g., 512 subcarriers assigned to one of 8×M sub-channels), the constellation size for each PHY sub-channel, and the cyclic prefix length.

The OFDMA frame profile may be exchanged after each OFDMA EVM session or after an OFDMA bandwidth reallocation event. The OFDMA frame profile specifies the transmitter assignment for the PHY sub-channels and the transmit power level for each PHY sub-channel. If an event in which PHY sub-channel reallocation is performed, then a short message, which may be part of a MAP packet, may be defined that specifies which PHY sub-channels are reallocated to which MAC sub-channel.

Bandwidth Reallocation

Probing and MAC signaling protocols may be used to negotiate OFDMA subcarrier allocations and may be implemented once per EVM maintenance cycle. However, traffic patterns are often dynamic and may change more frequently than an EVM maintenance cycle. Accordingly, a method of reallocating bandwidth during MAP cycles is provided. The method for reallocating bandwidth includes allocating PHY sub-channels such that they are suitable for more than one OFDMA link (i.e. form PHY sub-channels by partitioning the OFDM subcarriers into group of subcarriers that are suitable for multiple OFDMA links).

The NC may maintain a list of MAC sub-channels for which that PHY sub-channel is suitable for each PHY sub-channel. For example, the 13th PHY sub-channel may be suitable for MAC sub-channels 1, 3, 4, and 9. Thus, should traffic patterns shift, the 13th PHY sub-channel may be quickly reallocated from one MAC sub-channel to another MAC sub-channel to accommodate the change in network requirements. The multiplier M is a compromise between granularity of PHY sub-channels and the overhead of signaling PHY sub-channel reallocation—if this multiplier is large, then it is more likely that each PHY sub-channel will be suitable for more than just one MAC sub-channel allowing more reallocation options. However, the larger the multiplier, the more bandwidth is required to define the reallocation.

For reservation or bandwidth requests, it may not be possible to dynamically reallocate bandwidth to the extent that is required, particularly if the traffic patterns change drastically. In this case, the OFDMA reservation requests can be either replaced or augmented with non-OFDMA reservation requests. At the next OFDMA channel assessment opportunity, the OFDMA subcarrier allocations can be adapted to the new traffic pattern such that the non-OFDMA reservation requests are not required. Alternatively, the reservation request for all network nodes can be increased proportionally by increasing the OFDMA packet length or by adding another OFDMA packet.

Additionally, spare OFDMA bandwidth (independent of reservation requests) may be allocated to handle 'on-demand' traffic to the NC. For low-latency small packets, the NC can define OFDMA bandwidth every MAP cycle, and for low duty-cycle small packets, the NC can define OFDMA bandwidth every N MAP cycles. The bandwidth reallocation may be used for small internet protocol (IP) packets or voice over IP (VoIP) packets in an access network.

Figure 3:
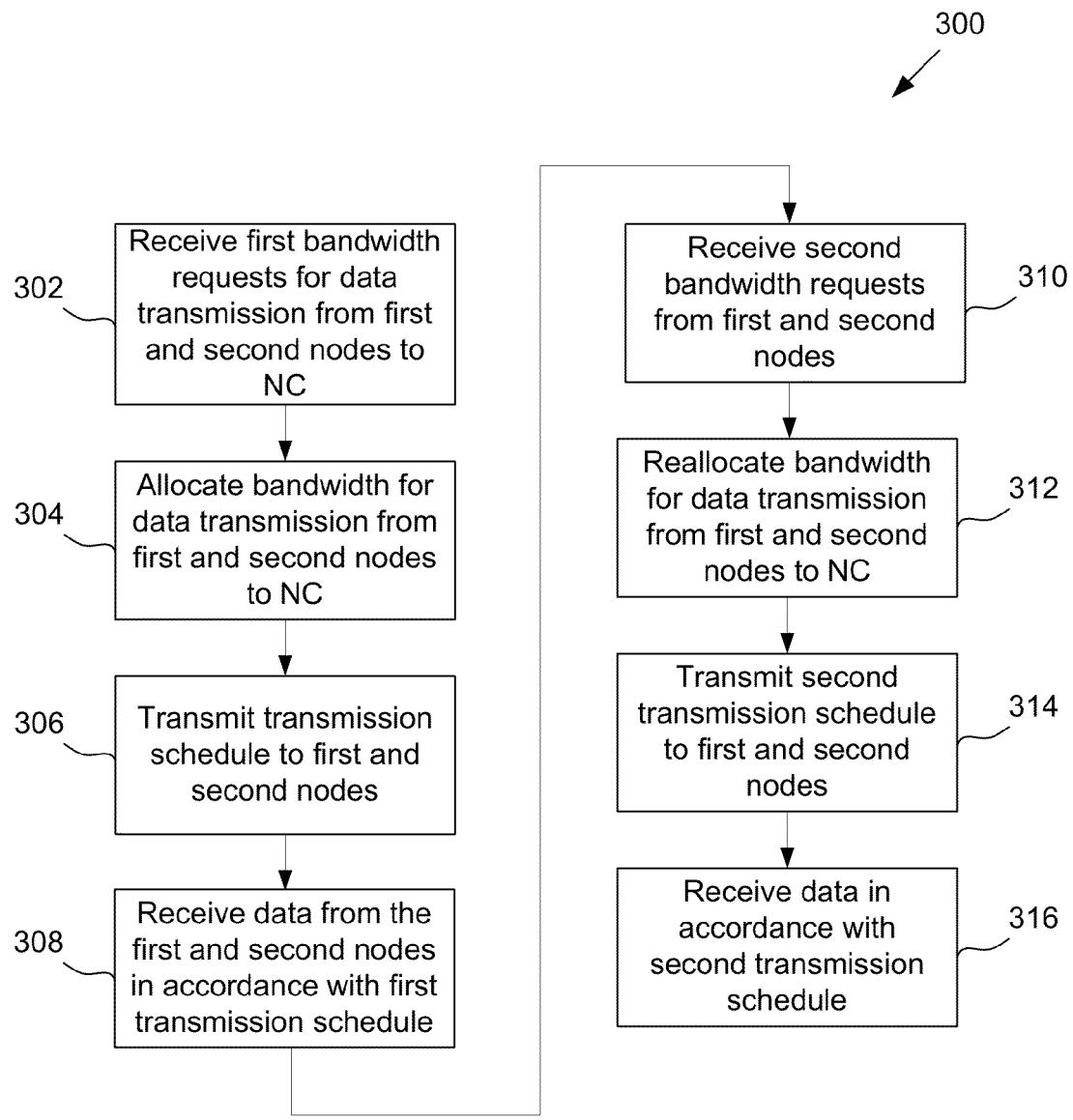
FIG. 3 is a flow diagram of one example of reallocating bandwidth in a coordinated network.
Figure 4A:
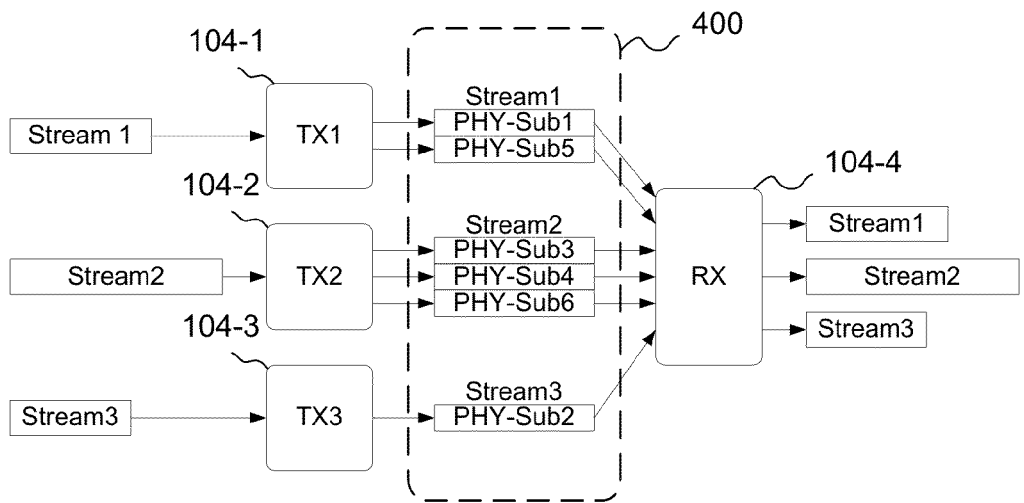
FIG. 4A is a block diagram of one example of multipoint-to-point data transmission using orthogonal frequency division multiple access (OFDMA).
Figure 4B:
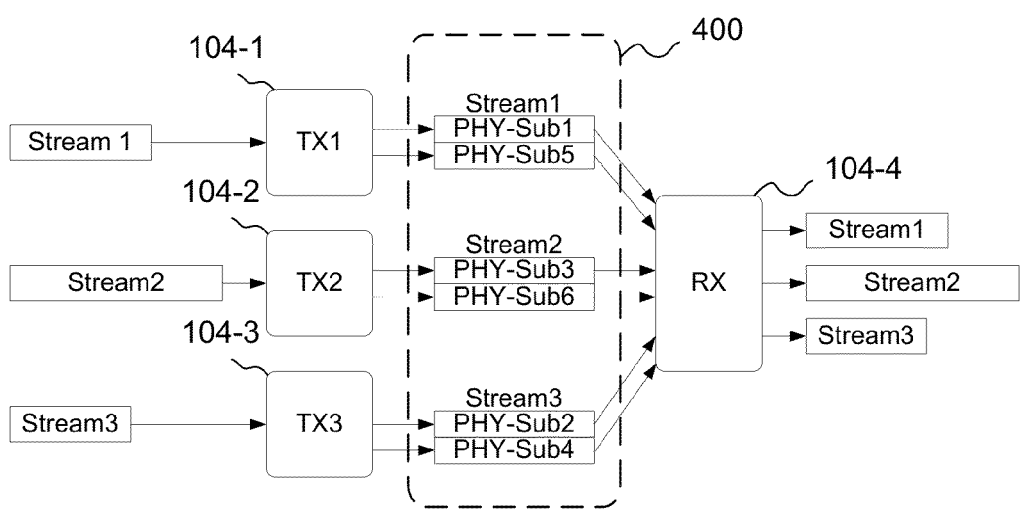
FIG. 4B is a block diagram of the multipoint-to-point data transmission illustrated in FIG. 4A in which the bandwidth has been reallocated.

One example of a method of reallocating bandwidth in a communication network is described with respect to FIGS. 3-4B. FIG. 3 is block diagram of a method 300 for reallocating bandwidth in a managed network. As shown in FIG. 3, requests for bandwidth are received at the NC from first and second network nodes at block 302. The requests for bandwidth may identify the type of data transmission, e.g., the quality of service required, the available resources of the network node that transmitted the service request, the data size that is to be transmitted by the network node, and the identity of the network nodes that are to be receiving the data transmission, which in this example is the NC.

At block 304, the NC allocates the bandwidth for data transmission from the first and second network nodes to the NC. The NC may allocate the bandwidth based on the data received in the request for bandwidth from the first and second network nodes. The NC transmits a first transmission schedule including the allocated bandwidth to the first and second network nodes at block 306. The first transmission schedule may be transmitted to first and second network nodes as a MAP packet broadcast to each of the network nodes in the coordinated network.

At block 308, the NC receives the data transmission from the first and second data packets in accordance with the first transmission schedule. FIG. 4A illustrates one example of a multipoint-to-point OFDMA frame profile for three transmitting (TX) network nodes 104-1:104-3 transmitting data to a receiving (RX) node 104-4, which in this example is the NC. As shown in FIG. 4A, the OFDMA frame consists of 3 MAC sub-channels, i.e., Stream1, Stream2, and Stream3, with each MAC sub-channel including a number of PHY sub-channels. For example PHY-Sub1 may include PHY sub-channels 1, 12, 13, and 21; PHY-Sub2 may include PHY sub-channels 2, 8, 11, and 16; PHY-Sub3 may include PHY sub-channels 3, 10, 15, and 18; PHY-Sub4 may include PHY sub-channels 4, 6, 17, and 23; PHY-Sub5 may include PHY sub-channels 5, 7, 19, and 24; and PHY-Sub6 may include PHY sub-channels 9, 14, 20, and 22. Each of the PHY sub-channels may correspond to a subcarrier set as described above. The data received from the first, second, and third network nodes may be simultaneously received by the NC 104-4 in a single OFDMA frame 400 illustrated in FIG. 4A.

At block 310, NC 104-4 receives second requests for bandwidth from the first and second network nodes 104-2, 104-3. For example, TX network node 104-2 may request less bandwidth for transmitting Stream2, and TX node 104-3 may request additional bandwidth for transmitting Stream3.

NC 104-4 determines a second transmission schedule reallocating bandwidth for the first and second nodes 104-2, 104-3 at block 312. At block 314, NC 104-4 transmits the second transmission schedule to the first and second nodes 104-2, 104-3. As described above, the second transmission schedule may include the reallocated bandwidth and be a MAP packet broadcast to each of the network nodes in the coordinated network.

At block 316, NC 104-4 receives the data in accordance with the second transmission schedule, i.e., NC 104-4 receives the data in the reallocated bandwidth. FIG. 4B illustrates one example of a multipoint-to-point OFDMA frame profile for the three TX network nodes 104-1:104-3 transmitting data to the NC node 104-4 in accordance with the second transmission schedule. As shown in FIG. 4B, PHY-Sub4 has been reallocated from Stream2 to Stream3 to accommodate the request for additional bandwidth received by NC 104-4 at block 310. The data received from the first, second, and third network nodes may be received by the NC 104-4 in a single OFDMA frame 400.

PSDU (Physical Layer Service Data Unit)

As described above, each TX network node transmits a single PSDU in multipoint-to-point OFDMA. The PSDU may transport a single non-aggregated MAC protocol data unit (MPDU) or an aggregated MPDU (i.e. an aggregation of one or more protocol data units (PDUs)). The OFDMA RX network node may simultaneously receive multiple transmitted PSDUs and combined, these PSDU's are defined as the OFDMA Aggregated PSDU. Each MPDU may be an arbitrary length and is transmitted via a single MAC sub-channel. A plurality of MPDUs can be aggregated into a single OFDMA PSDU. In some embodiments, 8 MPDUs can be aggregated into a single OFDMA PSDU.

Figure 5:
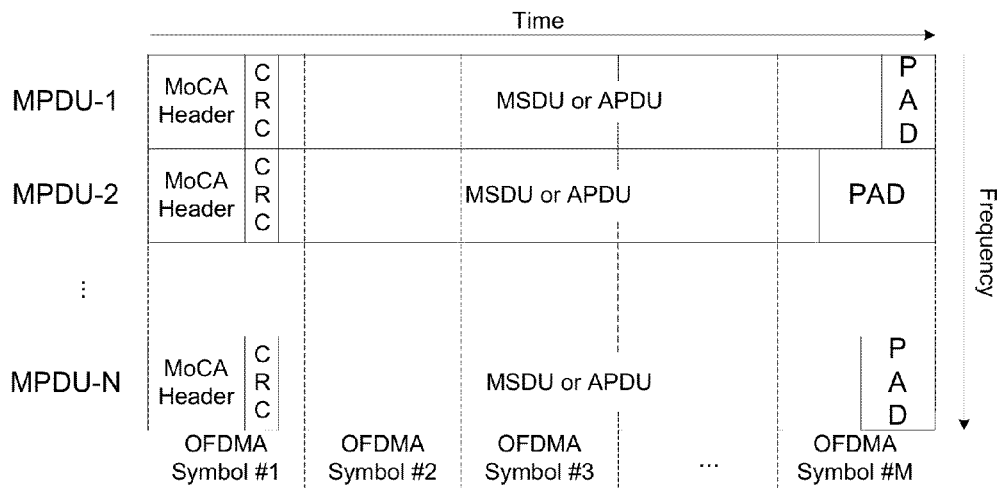
FIG. 5 is a block diagram of one example of an OFDMA PLCP Service Data Unit (PSDU) format.

The RX node may decode each OFDMA MPDU in the same manner as a non-OFDMA MPDU by context switching between each MAC sub-channel or buffering all MAC sub-channels and serially decoding each MAC sub-channel since each MPDU is an independent entity. FIG. 5 is a block diagram of one example of an OFDMA PSDU format. As shown in FIG. 5, the PAD, which may include forward error correct (FEC) and OFDM, is included as part of the data link layer (DLL) framing.

DLL Framing with LDPC Encoding

The OFDMA LDPC code may be implemented such that the LDPC decoder 128 is configured to simultaneously decode a plurality of OFDMA LDPC codes. For example, the LDPC decoder 128 may be configured to simultaneously decode 8 OFDMA LDPC codes. In this example, the decoder 128 may concatenate 8 OFDMA codewords and use the concatenated OFDMA LDPC parity check matrix to simultaneously decode the OFDMA codewords. The concatenated block of 8 OFDMA LDPC codewords is referred to herein as a codeword set.

Because the aggregated OFDMA data rate is lower than the data rate for non-OFDMA, the time to fill each codeword set is longer. Accordingly, OFDMA has more time for LDPC iterations than non-OFDMA codewords. Non-OFDMA codewords may benefit from statistical multiplexing of iterations (i.e. if one codeword requires fewer iterations, those iterations can be used for subsequent codewords). OFDMA codeword sets can also benefit from this but at codeword set boundaries only and not on individual OFDMA LDPC codewords. Thus, all OFDMA LDPC codewords within a codeword have equal iterations and the total number of iterations may be dictated by the worst case OFDMA LDPC codeword (up to the allocated maximum iterations). Any remaining iterations after decoding a codeword set can be applied to subsequent codeword sets.

Figure 6:
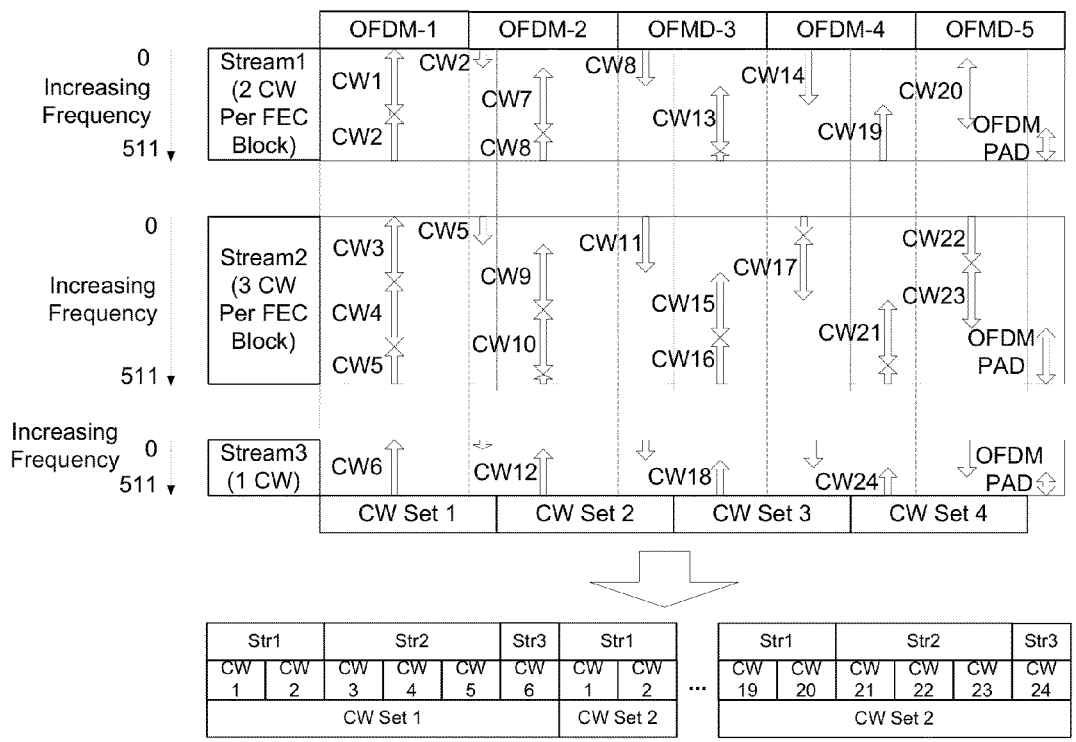
FIG. 6 is a block diagram illustrating one example of Low Density Parity Check (LDPC) codewords partitioned between Medium Access Control (MAC) sub-channels, OFDM symbols, and codeword sets.

FIG. 6 illustrates how LDPC codewords are partitioned between MAC sub-channels, OFDM symbols, and codeword sets. As shown in FIG. 6, the number of codewords per MAC sub-channel is $N_{CW,1}=2$, $N_{CW,2}=3$ and $N_{CW,3}=1$. Note that this is not the total number of OFDMA codewords in each MAC sub-channel, but rather the number of codewords per MAC sub-channel in each codeword set. In this example, there are 4 codeword sets and thus the total number of LDPC codewords in the i-th MAC sub-channel is $4 \times N_{CW,i}$. Because the sum of $N_{CW,i}$ is 6 and the LDPC decoder is capable of processing 8 codewords per codeword set, only 6/8-ths of the LDPC decoder decoding capability will be used (two dummy codewords may be inserted prior to decoding and subsequently tossed after decoding). Recall that the way that the bandwidth is allocated to the MAC sub-channels ensures that the last codewords in each codeword set is perfectly synchronized. This synchronization limits the buffering requirements to two OFDMA LDPC codeword sets.

Within any one MAC sub-channel, codeword bits are assigned to subcarriers in ascending subcarrier index order (0 to 511) regardless of PHY sub-channel partitions. The receiver uses the MAC sub-channel index to parse the OFDM subcarriers into MAC sub-channels starting with subcarrier 0 without complicated reordering. For example, given an LDPC codeword length of 576 bits, the samples of MAC sub-channel 1 are written into the codeword set buffer starting at location 0, the samples of MAC sub-channel 2 are written into the same codeword set buffer starting at location $N_{CW,1} \times 576 = 1152$, and the samples of MAC sub-channel 3 are written into the same codeword set buffer starting at location $(N_{CW,1}+N_{CW,2}) \times 576 = 2880$. Once a total of $(N_{CW,1}+N_{CW,2}+N_{CW,3}) \times 576 = 3456$ samples have been collected, the LDPC decoder processes the entire set, and any remaining samples after the last codeword set represent OFDM symbol padding and can be discarded. The number of OFDM pad bytes per MAC sub-channel is proportional to the number of codewords per MAC sub-channel.

FIG. 6 does not illustrate LDPC shortening, which may be accomplished by shortening the number of data bytes per codeword. Codeword shortening may be applied for several reasons. For example, codeword shortening may be implemented to accommodate PSDU frame lengths that are not exact multiples of the OFDMA LDPC codeword length and/or to allow for lower code rates for all OFDMA codeword lengths. The shortening decreases the code rate, but also decreases the number of iterations that can be performed. For example, shortening a codeword from 72 bytes (54 data bytes and 18 parity bytes totaling 576 bits) to 54 bytes (36 data bytes and 18 parity bytes totaling 432 bits) results in a rate 2/3 code, but the time available for iterations decreases by a factor of 3/4 due to the codewords requiring less data to fill. Codeword puncturing may also be implemented to reduce the number of parity bytes as will be understood by one skilled in the art.

Codeword shortening may be performed by adding padding to fill the codeword to 72 bytes, performing the LDPC processing, and then discarding the padding since padding is not transmitted over the channel. The padding is performed at both the TX node and the RX node. The padding values added at the TX node and the RX node are the same since the padding influences the parity bits.

Codeword shortening may be applied to accommodate PSDU frame lengths that are not exact multiples of the OFDMA LDPC codeword length. For example, if a frame length is 100 bytes and requires two LDPC codewords, then the first codeword may be 54 bytes and the second codeword may be 46 bytes. Shortening of the last codeword benefits the last codeword because the code rate is lower and thus the packet length is minimized such that an 'empty' OFDM symbol containing only LDPC pad bytes is not transmitted. The LDPC codewords in the last OFDMA codeword may be shortened by an equal amount to simplify the receiver LDPC padding implementation.

Another reason codeword shortening may be implemented is to allow for lower code rates for all OFDMA LDPC codeword lengths. Using the same 100 byte example described above, both codewords may be shortened to 50 bytes, which benefits all codewords in that is spreads the shortening of the last codewords over all the codewords. All the codewords each of the OFDMA codeword sets except for the last codeword set may can be shortened by an equal amount. The last codeword set may be adjusted such that it is longer or shorter than all of the codewords in the other codeword sets.

A second padding function may be performed at the RX node to accommodate a parallel LDPC decoder architecture configured to decode 8 codewords per codeword set as described above. For example, codeword set padding may pad each codeword set up to 8 codewords if less than 8 codewords per set are provisioned. Padding for codeword sets may use any valid codeword including an all-zero codeword. As noted above, using less than 8 codewords per codeword set decreases the number of iterations available because the codeword sets require less data to be filled.

Figure 7:
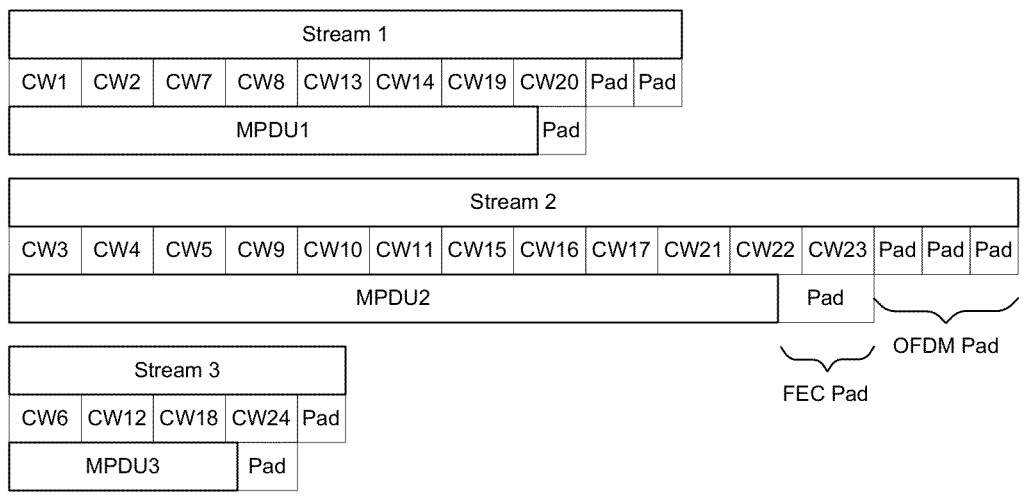
FIG. 7 is a block diagram illustrating one example of mapping MAC sub-channels to MPDUs.

At the completion of the LDPC decoding, the DLL partitions the decoded codewords into separate MAC sub-channels. Each MAC sub-channel includes one MPDU as illustrated in FIG. 7, which uses the same configuration as shown in FIG. 6. The partitioning is performed using a parsing function where codewords are routed based on their MAC sub-channel number. FIG. 6 illustrates both OFDM pad and FEC pad, which differs from codeword shortening or codeword set padding. OFDM pad is appended to the encoded byte MAC sub-channel to ensure that the last OFDM symbol is full. For OFDMA, the OFDM pad is applied to each MAC sub-channel and the amount of OFDM pad per MAC sub-channel is proportional to the number of codewords per MAC sub-channel. FEC pad fills all the codewords in each MAC sub-channel. OFDM and FEC pad may be scrambled to ensure randomness, which may be done by a byte scrambler. In some embodiments, the pad bytes are all zeros.

Frequency and Sampling TX Pre-Compensation

For multipoint-to-point OFDMA, each TX network node may have a different frequency and sampling offset relative to the RX network node. If the offset is substantial, the RX network node may estimate the offset for each TX network node and compensate for the offset in the time-domain. To reduce the complexity of the implementation and the resources of the RX network nodes required to compensate for the offset, each TX network node may estimate the phase offset between itself and the RX network node and pre-compensate its OFDMA packets accordingly.

The frequency and sampling offset is estimated at the RX network node whenever the RX network node receives data packets. Consequently, each network node has an estimate of the frequency and sampling offsets between itself and any other network node, including the OFDMA RX network node. In embodiments where the NC is the RX network node, the NC sends MAP packets at about 1 μsec intervals, which provides frequent estimates for frequency and sampling offsets. Scheduling OFDMA packets shortly after MAP packets enables the frequency and sampling offsets to be further limited.

Figure 8:
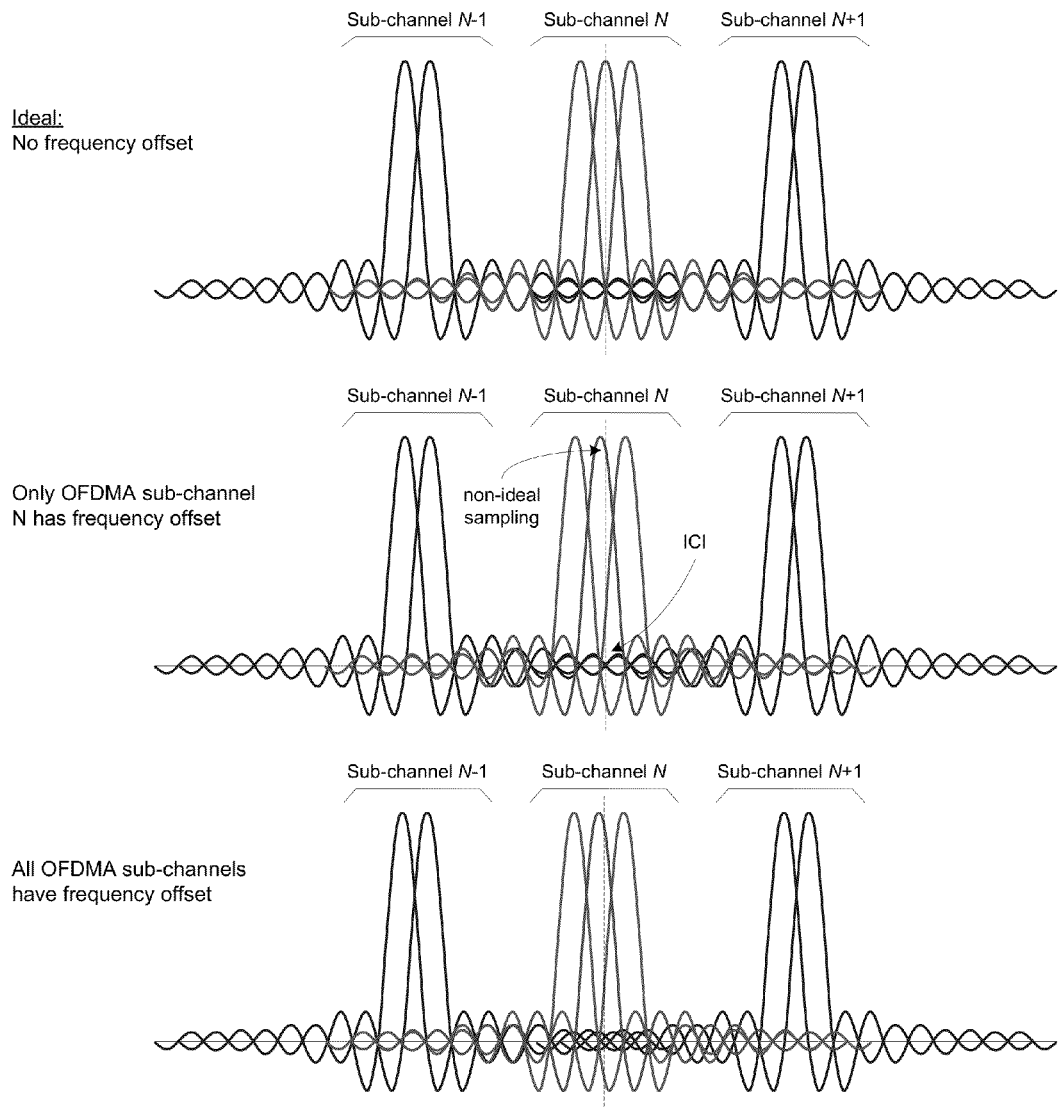
FIG. 8 is a plot showing the effect of inter-carrier interference (ICI) cause by frequency/sampling offset for three PHY sub-channels for an ideal case of with no frequency offset, a case in which only PHY sub-channel N experiences frequency offset, and a case in which each of the PHY sub-channels experience frequency offset.

FIG. 8 illustrates the effect of inter-carrier interference (ICI) caused by frequency/sampling offset for three PHY sub-channels for an ideal case of with no frequency offset, a case in which only PHY sub-channel N experiences frequency offset, and a case in which each of the PHY sub-channels experience frequency offset.

For the ideal case, each of the peaks of the each subcarriers exactly align with the RX network node's expected subcarrier locations and are disposed within the nulls of all other subcarriers. Accordingly, there is no loss of orthogonality.

In the case in which only PHY sub-channel N experiences a frequency offset, the subcarrier peaks of PHY sub-channel N do not align with the receiver's expected subcarrier locations, but the other PHY sub-channels are aligned. Additionally, the side-lobes of PHY sub-channel N are not zero at the peaks of the other subcarriers. A loss of the desired signal power is incurred as the subcarrier peaks of the PHY sub-channel N are not sampled at their peaks. Additionally, the subcarriers of the PHY sub-channels with frequency offset introduce interference into the subcarriers of PHY sub-channel N, and the subcarrier side-lobes of PHY sub-channel N introduce interference into the PHY sub-channels that do not experience frequency offset. Accordingly, the loss of signal power and ICI is increased when each of the PHY sub-channels experience a frequency offset. Frequency and sampling offset may pre-compensated in the time-domain of the TX network node using analog or digital techniques as will be understood by one skilled in the art.

Frequency Domain Tracking and Compensation

For the most part, the physical layer (PHY) of the RX network node is agnostic to whether or not the received packet is an OFDM or OFDMA packet. The only exception is the timing and frequency tracking loops (and consequently the frequency-domain rotator). Although each TX network node pre-compensates for timing and frequency offsets, some residual offsets may exist. The residual offsets will be small enough such that no significant loss in orthogonality between subcarriers will be observed; however, in the frequency domain, the constellations may still rotate. Accordingly, frequency-domain tracking and compensation of sampling and frequency offset may be implemented.

The RX network node individually tracks each OFDMA TX network node to estimate and compensate for the residual offset. The tracking of the OFDMA TX network node may be accomplished by instantiating a plurality of tracking loops (one per OFDMA transmitter). As a consequence, the tracking loops will use fewer subcarriers than are typically used for non-OFMA. For example, if 8 tracking loops are implemented, then the number of subcarriers used is ⅛-th of the subcarriers typically used for non-OFDMA. The reduction in subcarriers may result in a decrease in processing gain, which may be compensated for by adding additional bitloading margin.

A common phase error (CPE) estimator and compensator may be implemented to mitigate receiver phase noise. Given that the receiver phase noise is a receiver impairment, CPE estimation and compensation does not need to be performed on a per-transmitter basis. Accordingly, CPE estimation and compensation is identical regardless of whether or not the receiver is processing an OFDM or OFDMA packet.

Transmission Power Control

Power control may applied by each of the TX network nodes such that all transmitted signals arrive at the OFDMA receiver with approximately the same receive power level. Implementing power control helps to ensure that all the component signals of the aggregated OFDMA signal fall within the dynamic range of the RX network node and that TX network nodes located closer to the RX network node than other TX network nodes do not effectively drown out the TX network nodes located further away.

ICI is a driving factor in transmit power control accuracy as every dB of power control inaccuracy raises the ICI level by a corresponding dB. While ICI is minimized when all sub-carriers are received at exactly the same level, the penalty of receive level variations can be mitigated by ensuring that between 'close' subcarriers the receive level variations are minimized since ICI is dominated by the nearest subcarriers. For example, putting higher level sub-carriers at one end of the spectrum and lower level subcarriers at the other end provides considerably more margin.

Transmission power control may be achieved through a variety of methods. For example, power control may be implemented through analog or digital mechanisms. Another manner through which power control may be implemented is through digital power boosting at the TX network node. Since each TX network node only uses a subset of subcarriers, the average energy of an OFDMA signal will be lower than an OFDM signal. Accordingly, the power of an OFDMA signal may be boosted by the TX network node. In some embodiments, TX network nodes transmitting OFDMA signals are grouped into 'near' transmitters and 'far' transmitters and separate OFDMA packets are used for each group of transmitters. TX network nodes in the far group may be assigned lower constellation values and TX network nodes in the near group may be assigned higher constellation values as each drop in constellation size provides an additional protection against ICI. Thus, signals received from TX network nodes in the far group may be received at lower levels than signals received from TX network nodes in the near group without degradation due to ICI.

Performance Simulations

For Mesh networks, OFDMA provides a more efficient method of transmitting reservation requests, which provides increased MAC-layer throughput gains. Assume, for example, the preamble duration (PD), OFDM payload duration ($OFDM_{PLD}$), and the OFDMA payload duration ($ODFMA_{PLD}$) of a packet with M bytes in 100 MHz sample counts are equal to $$PD = IFG \times 100 \text{ samples}/\mu\text{sec} + N_{SS} \times 64 + N_{LS} \times 128 + N_{CE} \times 512 + CP_0 \qquad \text{Eq. 4}$$

$$OFDM_{PLD} = \text{ceiling}(M \times 8/(N_{sc} \times N_{BSC} \times R)) \times (512 + CP) \qquad \text{Eq. 5}$$

$$OFDMA_{PLD} = \text{ceiling}(M \times 8/(\text{floor}(N_{SC}/N_{Str}) \times N_{Bsc} \times R)) \times (512 + CP) \qquad \text{Eq. 6}$$

Where,
 IFG is the interframe gap in μsec
 $N_{SS}$ is the number of short sequences having 64 bits per sequence;
 $N_{LS}$ is the number of long sequences having 128 bits per sequence;
 $N_{CE}$ is the number of channel estimation symbols having 512 bits per symbol;
 $CP_0$ is the cyclic prefix
 $N_{SC}$ is the number of subcarriers; and
 $N_{Bsc}$ is the number of bits per subcarrier.
 For OFDMA, the total number of subcarriers $N_{SC}$ are equally distributed among all MAC sub-channels (nodes). Table 1, below, defines the modulation configurations for worst case and typical scenarios (from an OFDMA point of view, where worst case is non-OFDMA at maximum efficiency and OFDMA at minimum efficiency) for the simulations.

TABLE 1

| | | Typical | Worst Case | | Typical Case | |
|---|---|---|---|---|---|---|
| | Definition | MoCA1.x | OFDM | OFDMA | OFDM | OFDMA |
| IFG | Interframe gap, μsec | 10 | 5 | 5 | 5 | 5 |
| $N_{SS}$ | Number of short segments | 0 | 0 | 0 | 0 | 0 |
| $N_{LS}$ | Number of long segments | 1 | 0 | 0 | 0 | 0 |
| $N_{CE}$ | Number of channel estimation symbols | 2 | 1 | 2 | 1.5 | 2 |
| $CP_0$ | Cyclic prefix of channel estimation sequence | 2 × (100 + 32) | 128 | 196 | 128 | 128 |
| CP | Cyclic prefix of data symbols | 2 × 32 | 32 | 96 | 64 | 96 |
| $N_{SC}$ | Number of available subcarriers | 224 | 480 | 480 | 480 | 480 |
| $N_{BAS}$ | Number of bits per subcarrier | 8 | 9.6 | 4 | 8.5 | 6 |
| R | FEC code rate | 192/208 | 4/5 | 3/4 | 4/5 | 3/4 |
| | Minimum Packet Duration | 52 | 20 | 20 | 30 | 30 |

The overhead due to a reservation requests (RRs) is computed as follows (i.e. fraction of time spent transmitting RRs) for a mesh network:

$$OFDM\ RR\ overhead = (PD + OFDM_{PLD}) \times Nnodes / (MAP\_cycle \times 1e5) \quad \text{Eq. 7}$$

$$OFDMA\ RR\ overhead = (PD + OFDMA_{PLD}) / (MAP\_cycle \times 1e5) \quad \text{Eq. 8}$$

Where,
Nnodes is the number of nodes in the mesh network; and
MAP_cycle is the duration of the MAP cycle in milliseconds.

Figure 9:
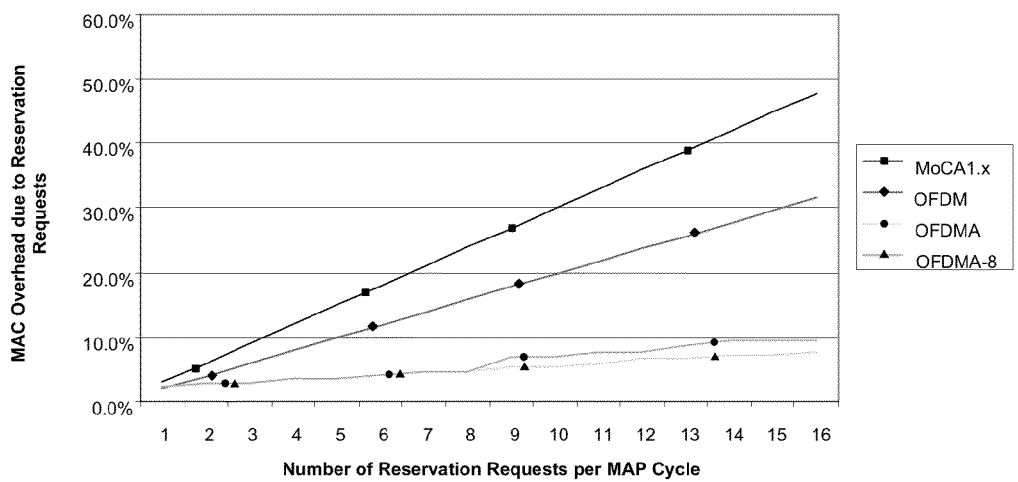
FIG. 9 is a plot of the percentage of MAC overhead due to reservation requests versus the number of reservation requests per Media Access Plan (MAP) cycle.

FIG. 9 is a plot of the overhead calculations for the typical set of modulation configurations and a reservation payload length of M=162 bytes for OFDM and M=200 bytes for MoCA1.x. Two OFDMA modes are considered: the first supports up to 16 MAC sub-channels per packet and the second supports only 8 MAC sub-channels per packet and thus uses two packets if the number of MAC sub-channels is more than 8. The benefit of OFDMA is readily apparent—it is three times more efficient than ODFM packets and five times more efficient than MoCA1.x.

The impact on MAC throughput ($MAC_{TP}$) can be estimated by computing the data throughput after accounting for the overhead due to reservation requests. The data throughput is computed as $$MAC_{TP}\ (Mbps) = 100e3/(PD + OFDM_{PLD}) \times 8 \times M \times (1 - RR\ overhead) \quad \text{Eq. 9}$$

Where, $M_{RR}$=reservation request payload length is used to compute the 'RR overhead' term; and
$M_{Data}$=data packet payload length is used to compute the throughput and 'OFMD payload duration'.

Figure 10:
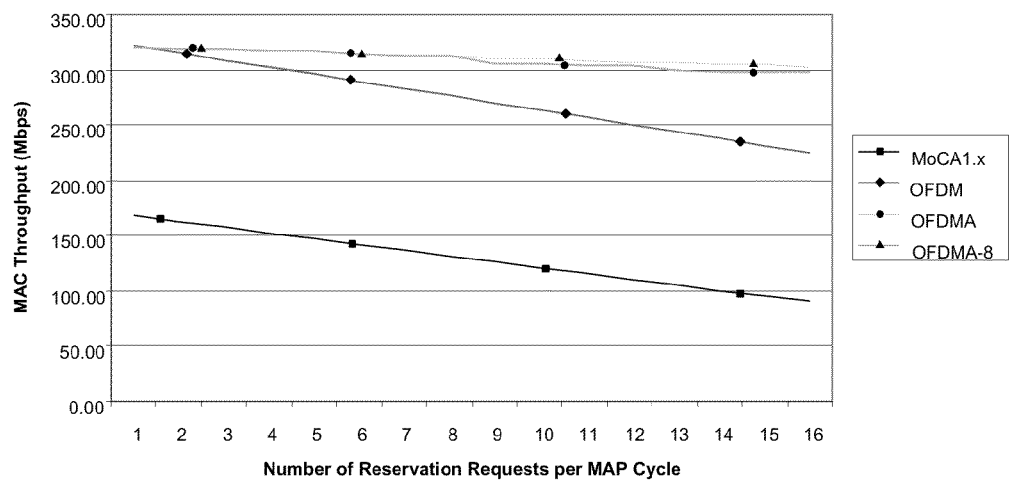
FIG. 10 is a plot of MAC throughput versus the number of reservation requests per MAP cycle.
Figure 11:
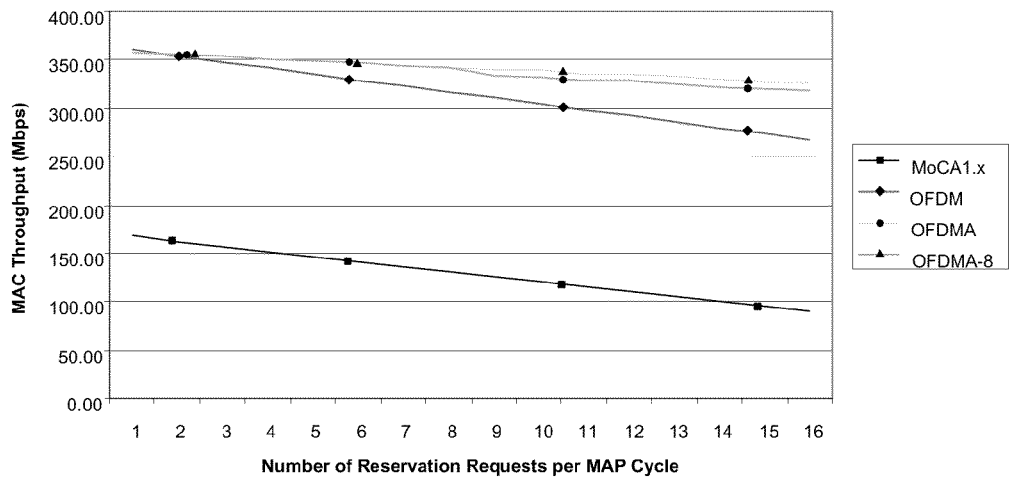
FIG. 11 is a plot of a worst case scenario of MAC throughput versus the number of reservation requests per MAP cycle.

FIG. 10 is a plot illustrating the data throughput assuming $M_{RR,MoCA1.x}$=200 bytes, $M_{RR,c.LINK+}$=162 bytes and $M_{Data}$=1518 bytes, and FIG. 11 is a plot illustrating the worst case set using the same assumptions. As shown in FIGS. 10 and 11, OFDMA provides anywhere from a 59 to 78 Mbps improvement in MAC throughput for a 17 node network, which is approximately equivalent to about 3.7 to 4.9 Mbps per node.

The methods described herein may be at least partially embodied in the form of computer-implemented processes and apparatus for practicing those processes. The disclosed methods may also be at least partially embodied in the form of computer program code embodied in tangible machine readable storage media, such as random access memory (RAM), read only memories (ROMs), CD-ROMs, DVD-ROMs, BD-ROMs, hard disk drives, flash memories, or any other machine-readable storage medium, wherein, when the computer program code is loaded into and executed by a computer, the computer becomes an apparatus for practicing the method. The methods may also be at least partially embodied in the form of computer program code, whether loaded into and/or executed by a computer, such that, when the computer program code is loaded into and executed by a computer, the computer becomes an apparatus for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the systems and methods have been described in terms of exemplary embodiments, it is not limited thereto. Rather, the appended claims should be construed broadly, to include other variants and embodiments of the systems and methods, which may be made by those skilled in the art without departing from the scope and range of equivalents of the systems and methods. Delimiters used in the claims—such as 'a)' and 'i)'—should not be taken as imputing any order to the claims, but rather are provided only to serve as visual cues to add in the parsing of the claims and as identifiers in the event that a particular portion of the claim is to be later referenced.

What is claimed is:
1. A method, comprising:
a) receiving a first data transmission at a first network node from a second network node, the first data transmission received in a first bandwidth of a coordinated network, the first bandwidth including a first plurality of subcarriers;
b) receiving a second data transmission at the first network node from a third network node, the second data transmission received in a second bandwidth of the coordinated network, the second bandwidth including a second plurality of subcarriers;
c) transmitting a first transmission schedule from the first network node to the second and third network nodes, the first transmission schedule including modified first and second bandwidths in which the modified first bandwidth includes a subcarrier reallocated from the second bandwidth; and
d) receiving data at the first network node in accordance with the first transmission schedule.

2. The method of claim 1, wherein the first and second data transmissions are received in a first orthogonal frequency division multiple access (OFDMA) frame at the first network node.

3. The method of claim 2, wherein the first OFDMA frame has a first frame length, the method further comprising:
   e) detecting an increase in bandwidth demand in the coordinated network; and
   f) instantaneously increasing the length of the first OFDMA frame to a second length in response to detecting the increase in bandwidth demand.

4. The method of claim 3, wherein the data received in accordance with the first transmission schedule is received in an OFDMA frame of the second length.

5. The method of claim 1, further comprising:
   e) receiving reservation requests from the second and third network nodes requesting bandwidth for transmitting data to the first network node;
   f) determining a second transmission schedule at the first network node, the second transmission schedule respectively allocating the first and second bandwidths to the second and third network nodes; and
   g) transmitting the second transmission schedule from the first network node to the second and third network nodes,
   wherein steps e), f), and g) are performed prior to step a).

6. The method of claim 5, wherein the second transmission schedule is a media access plan (MAP) packet, and wherein the coordinated network is a Multimedia over Coaxial Network Alliance (MoCA) network.

7. The method of claim 1, wherein the first plurality of subcarriers define a third plurality of physical layer (PHY) sub-channels, the method further comprising:
   e) mapping the first plurality of subcarriers among the third plurality of PHY sub-channels, wherein each of the PHY sub-channels includes at least one sub carrier.

8. The method of claim 7, wherein the PHY sub-channels are defined to enable each PHY sub-channel to be used by a plurality of additional transmitting network nodes in the coordinated network.

9. The method of claim 7, wherein a number of PHY sub-channels are able to be used by more than one of the network nodes in the coordinated network.

10. The method of claim 9, further comprising:
    f) allocating the number of PHY sub-channels that are able to be used by more than one of the network nodes in the coordinated network to network nodes requesting additional bandwidth.

11. The method of claim 9, further comprising:
    f) allocating the number of PHY sub-channels that are able to be used by each of the network nodes in the coordinated network, wherein each of the network nodes in the coordinated network is periodically allocated the number of PHY sub-channels for transmitting data.

12. The method of claim 1, wherein
    the first data transmission is received in a first orthogonal frequency division multiple access (OFDMA) frame from the second network node,
    the second data transmission is received in a second OFDMA frame from the third network node, and
    a propagation signal loss between the second node and the first network node is greater than a propagation signal loss between the third network node and the first network node.

13. The method of claim 12, wherein the second network node transmits the first data transmission with an increased transmission power compared to a transmission power with which the third network node transmits the second data transmission.

14. The method of claim 12, wherein the second network node transmits the first data transmission with a reduced constellation mapping compared to a constellation mapping with which the third network node transmits the second data transmission.

15. A network node, comprising:
    a receiver configured to
      receive a first data transmission from a first network node in a first bandwidth of a coordinated network, the first bandwidth including a first plurality of subcarriers,
      receive a second data transmission from a second network node in a second bandwidth of the coordinated network, the second bandwidth including a second plurality of subcarriers; and
    a transmitter configured to transmit a first transmission schedule to the first and second network nodes, the first transmission schedule including modified first and second bandwidths in which the modified first bandwidth includes a subcarrier reallocated from the second bandwidth.

16. The network node of claim 15, wherein the receiver is configured to receive the first and second data transmissions in a first orthogonal frequency division multiple access (OFDMA) frame.

17. The network node of claim 16, wherein the first OFDMA frame has a first frame length, the network node further comprising a processor configured to detect an increase in bandwidth demand in the coordinated network and instantaneously increase the length of the first OFDMA frame to a second length in response to detecting the increase in bandwidth demand.

18. The network node of claim 17, wherein the receiver is configured to receive the first transmission schedule in an OFDMA frame having the second length.

19. The network node of claim 15, wherein the first plurality subcarriers define at least one physical (PHY) layer sub-channel.

20. The network node of claim 15, wherein the first plurality of subcarriers define a third plurality of physical layer (PHY) sub-channels, the network node further comprising:
    a processor configured to map the first plurality of subcarriers among the third plurality of PHY sub-channels, wherein each of the PHY sub-channels includes at least one subcarrier.

21. The network node of claim 20, wherein the PHY sub-channels are defined to enable each PHY sub-channel to be used by a plurality of additional transmitting network nodes in the coordinated network.

22. The network node of claim 20, wherein a number of PHY sub-channels are able to be used by more than one of the network nodes in the coordinated network.

23. The network node of claim 22, wherein the processor is configured to allocate the number of PHY sub-channels that are able to be used by more than one of the network nodes in the coordinated network to network nodes requesting additional bandwidth.

24. The network node of claim 22, wherein the processor is configured to allocate the number of PHY sub-channels that are able to be used by each of the network nodes in the coordinated network, and wherein each of the network nodes in the coordinated network is periodically allocated the number of PHY sub-channels for transmitting data.

25. The network node of claim 15, wherein the receiver is configured to
- receive the first data transmission in a first orthogonal frequency division multiple access (OFDMA) frame from the first network node with a first propagation signal loss, and
- receive the second data transmission in a second OFDMA frame from the second network node located with a second propagation signal loss,
- wherein the first propagation signal loss is greater than the second propagation signal loss.

26. The network node of claim 25, wherein the first network node transmits the first data transmission with an increased transmission power compared to a transmission power with which the second network node transmits the second data transmission.

27. The network node of claim 25, wherein the receiver is configured to receive the first data transmission with a reduced constellation mapping compared to the second data transmission.

28. A non-transitory computer readable storage medium encoded with program code, wherein when the program code is executed by a processor, the processor performs a method, the method comprising:
a) receiving a first data transmission at a first network node from a second network node in a coordinated network, the first data transmission received in a first bandwidth including a first plurality of subcarriers;
b) receiving a second data transmission at the first network node from a third network node in the coordinated network, the second data transmission received in a second bandwidth including a second plurality of subcarriers;
c) transmitting a first transmission schedule from the first network node to the second and third network nodes, the first transmission schedule including modified first and second bandwidths in which the modified first bandwidth includes a subcarrier reallocated from the second bandwidth; and
d) receiving data at the first network node in accordance with the first transmission schedule.

* * * * *